United States Patent
Wood

(10) Patent No.: US 11,598,396 B2
(45) Date of Patent: Mar. 7, 2023

(54) METHOD OF ALIGNING AND SEATING INDUSTRIAL BELTS AND BELT GRIPPING TOOL THEREFOR

(71) Applicant: Dow Global Technologies LLC, Midland, MI (US)

(72) Inventor: Anthony B. Wood, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 732 days.

(21) Appl. No.: 16/481,348

(22) PCT Filed: Mar. 14, 2018

(86) PCT No.: PCT/US2018/022322
§ 371 (c)(1),
(2) Date: Jul. 26, 2019

(87) PCT Pub. No.: WO2018/175168
PCT Pub. Date: Sep. 27, 2018

(65) Prior Publication Data
US 2020/0003284 A1    Jan. 2, 2020

Related U.S. Application Data

(60) Provisional application No. 62/474,379, filed on Mar. 21, 2017.

(51) Int. Cl.
*F16H 7/24* (2006.01)
*B25B 25/00* (2006.01)

(52) U.S. Cl.
CPC ............... *F16H 7/24* (2013.01); *B25B 25/00* (2013.01)

(58) Field of Classification Search
CPC ............ F16H 7/24; B25B 27/22; B25B 25/00
(Continued)

(56) References Cited

U.S. PATENT DOCUMENTS

| 429,861 | A | * | 6/1890 | Neszler | .................... F16H 7/24 474/130 |
| 433,825 | A | * | 8/1890 | Scheuerle | ................. F16H 7/24 474/130 |

(Continued)

FOREIGN PATENT DOCUMENTS

| AU | 2169477 A | 8/1978 |
| FR | 676530 A | 2/1930 |
| JP | H09-137852 A | 5/1997 |

OTHER PUBLICATIONS

PCT/US2018/022322, International Search Report and Written Opinion dated Jul. 2, 2018.

(Continued)

*Primary Examiner* — Henry Y Liu
(74) *Attorney, Agent, or Firm* — Quarles & Brady LLP

(57) ABSTRACT

A belt pulling tool is comprised of a handle, a body and two prongs, the handle and body each having two ends with one end of each being attached to the other forming a longitudinal length and the two prongs being attached to the body orthogonal to the length, wherein at least one prong is configured to be moved and fixed along a portion of the length of the body. The belt pulling tool is useful for aligning, seating and setting the tension of belts for industrially belt driven machinery. In performing the method, the belt is inserted between the gap between the prongs of the tool and the tool is rotated about an axis centered in the gap and running parallel to the prongs projecting from the body of the tool to engage the belt and cause the rotation of the sheaves, thus allowing the sheaves to be aligned using alignment tools and allowing the belt to properly seat. Once (Continued)

seated and aligned, the tension may be set using a belt tension gauge.

10 Claims, 3 Drawing Sheets

(58) Field of Classification Search
USPC .......................................................... 474/130
See application file for complete search history.

(56) References Cited

U.S. PATENT DOCUMENTS

| | | | | |
|---|---|---|---|---|
| 697,454 A * | 4/1902 | Davison | ..................... | F16H 7/24 474/130 |
| 801,615 A * | 10/1905 | Siegwart | ................... | F16H 7/24 474/130 |
| 1,000,271 A * | 8/1911 | Ladinski | ................... | F16H 7/24 474/130 |
| 1,260,677 A * | 3/1918 | Jezowski | ................... | F16H 7/24 474/130 |
| 1,318,727 A * | 10/1919 | Cohn | ........................ | F16H 7/24 474/130 |
| 1,373,230 A * | 3/1921 | Gainor | .................... | B25B 27/22 254/231 |
| 1,410,383 A * | 3/1922 | Davis | ........................ | F16H 7/24 474/130 |
| 1,489,123 A * | 4/1924 | Heatherington | ........ | B25B 27/22 254/231 |
| 1,542,580 A * | 6/1925 | Price | ........................ | F16H 7/24 474/130 |
| 2,121,129 A * | 6/1938 | Malone | .................... | F16H 7/24 29/244 |
| 2,470,810 A * | 5/1949 | Engard | .................... | F16H 7/24 474/130 |
| 2,621,529 A * | 12/1952 | Hawkins | ................... | F16H 7/24 474/130 |
| 4,111,063 A * | 9/1978 | Journey | .................... | F16H 7/24 474/130 |
| 4,715,844 A * | 12/1987 | Fambrough | ............... | F16H 7/24 81/64 |
| 5,653,654 A * | 8/1997 | Davis | ........................ | F16H 7/24 474/119 |
| 8,403,784 B2 * | 3/2013 | Conneely | ................... | F16H 7/24 474/130 |
| 8,684,871 B2 * | 4/2014 | Mitchell | .................... | F16H 7/24 474/130 |
| 9,573,259 B1 * | 2/2017 | Elsasser | ................... | B25B 27/10 |
| 9,643,302 B2 * | 5/2017 | Staley | ........................ | F16H 7/24 |
| 11,161,224 B2 * | 11/2021 | Beggs | ...................... | B25B 27/22 |
| 2003/0211910 A1 * | 11/2003 | Gerring | ...................... | F16H 7/24 474/130 |
| 2005/0170923 A1 * | 8/2005 | Hodjat | ...................... | F16H 7/24 474/130 |
| 2008/0047251 A1 * | 2/2008 | Tillberg | ................... | B25B 27/22 59/7 |
| 2010/0069186 A1 * | 3/2010 | Conneely | ................... | F16H 7/24 474/130 |

OTHER PUBLICATIONS

PCT/US2018/022322, International Preliminary Report on Patentability dated May 31, 2019.
PCT/US2018/022322, Written Opinion dated Feb. 6, 2019.
U.S. Pat. No. 298,929, dated May 20, 1884, Higginsville et al.

* cited by examiner

METHOD OF ALIGNING AND SEATING INDUSTRIAL BELTS AND BELT GRIPPING TOOL THEREFOR

FIELD OF THE INVENTION

The present invention relates to the field of belt driven industrial blowers and pumps and the setup and maintenance thereof. In particular the invention relates to a tool to engage a belt of an industrial pump or blower to set the proper alignment and seating of the belt as well as setting the tension of the belt.

Compressors, pumps and blowers are commonly used in industry. The size of these may be from several hundreds of pounds to several tons. Often they are belt driven by a separate large electric motor connecting through one or more rubber belts. The belts connect through a sheave on a shaft of the electric motor and the compressor, pump or blower. The rotational mass may be several hundred pounds or more. When replacing the belt or belts, the distance between the sheaves is lessened to allow easy removal of the belt or belts. Once the new belt is placed on both sheaves, the belts must be rotated to ensure that the belts seat properly and the sheaves are aligned to avoid damage to the belt, motor or apparatus as well as setting the tension once the alignment and belt is properly seated. Because, at least in part, of the large rotational mass, the possibility of severe hand injury may occur if ones hand is not removed once the belt starts to rotate (pinch point between the belt and sheave).

Thus, it would be desirable to provide a method for avoiding potential hand injuries when performing maintenance on belt driven industrial scale machinery.

SUMMARY OF THE INVENTION

One aspect of the invention is a belt pulling tool comprised of a handle, a body and two prongs, the handle and body each having two ends with one end of each being attached to the other forming a longitudinal length and the two prongs being attached to the body orthogonal to the length, wherein at least one prong is configured to be moved and fixed along a portion of the body parallel or nearly parallel to the longitudinal length.

A second aspect of the invention is a method of aligning sheaves of belt driven machinery comprising, (i) providing an apparatus having a shaft that has a sheave having a belt having a thickness, width and length that is driven by a motor having a shaft and a sheave with the belt such that when the motor shaft rotates the shaft of the apparatus rotates by motion of the belt, (ii) moving one or more of the prongs of the belt pulling tool of the first aspect such that the prongs form a gap between the prongs the gap being greater than the thickness of the belt but less than a separation corresponding to when the belt is inserted between the gap parallel to the thickness of the belt such that handle is perpendicular to the belt length and both prongs engage with the belt upon the tool handle being rotated less than or equal to forty five degrees around an axis extending from the center of the gap parallel to the length of the prongs, (iii) inserting the belt into the gap and rotating the tool and applying a force on the tool once the prongs of the tool engage with the belt to rotate the sheaves, (iv) removing the tool by rotating the tool in the opposite direction of rotation in step (iii) disengaging the prongs from the belt and withdrawing the belt from the gap, and (iv) aligning the sheaves by adjusting the positioning of the sheaves of the motor and apparatus and allowing the belt to seat on the sheaves by allowing the belt to rotate one or more rotations. The belt pulling tool of the invention allows hands free initiation of rotation of belt driven apparatus necessary to set the proper alignment and seating of the belt of such apparatus while also allowing the quick removal of the tool from the belt without having a hand coming in contact or impinging upon the rotating belt and sheaves, which may have rotational masses of a 100 kilograms or more, thus avoiding substantial risks of pinched or amputated fingers between the belt and the sheave.

DETAILED DESCRIPTION OF THE INVENTION

Figure 1:
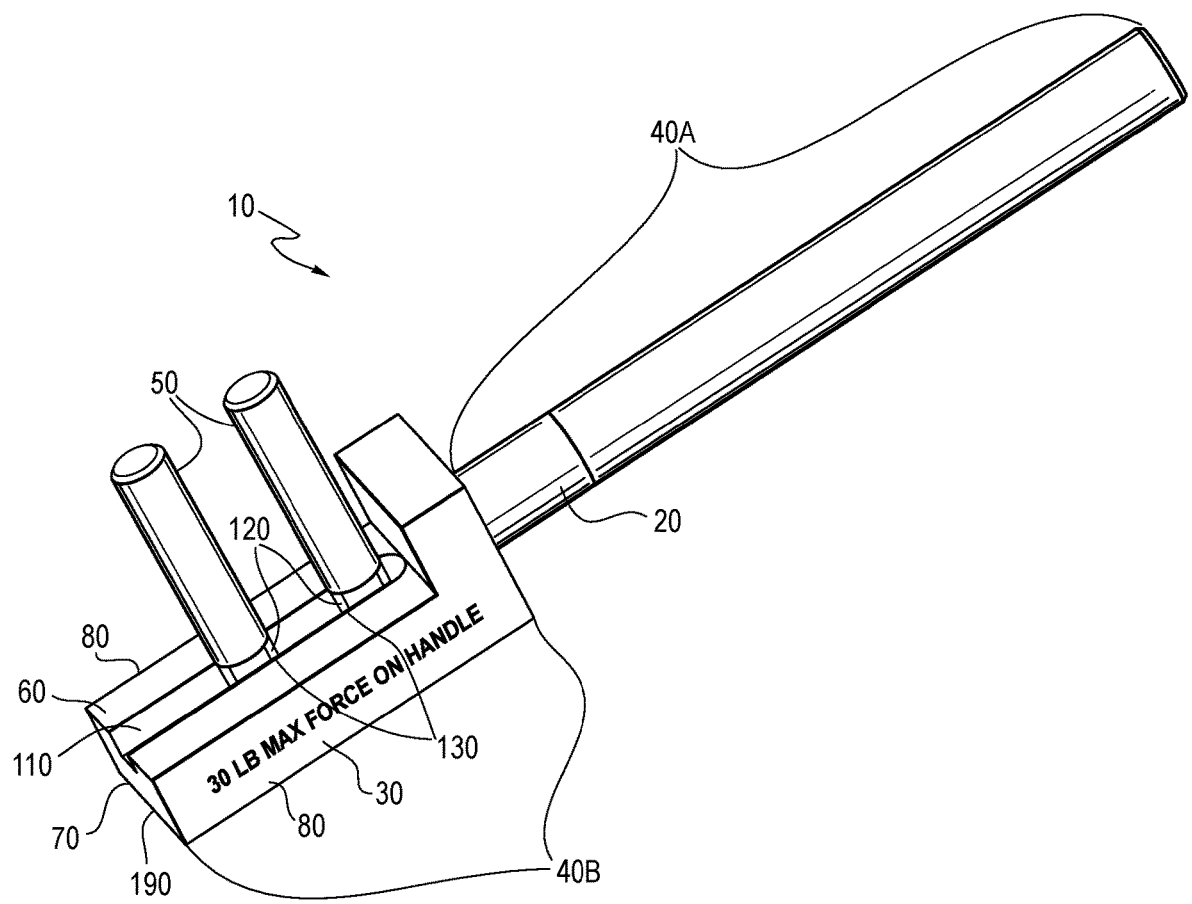
FIG. 1 is a perspective view of one embodiment of the belt pulling tool of this invention.
Figure 2:
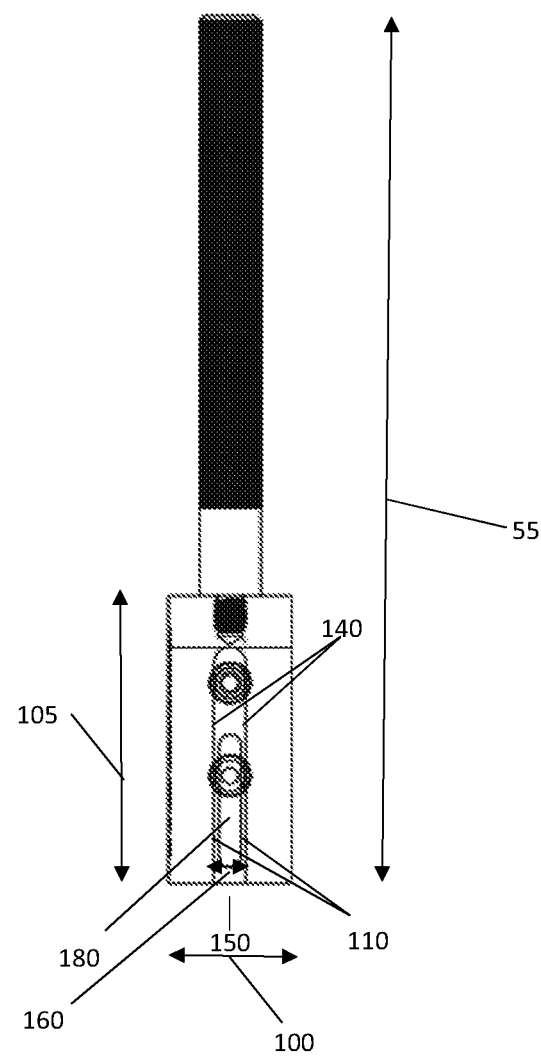
FIG. 2 is a side view of one embodiment of the belt pulling tool of this invention.
Figure 3:
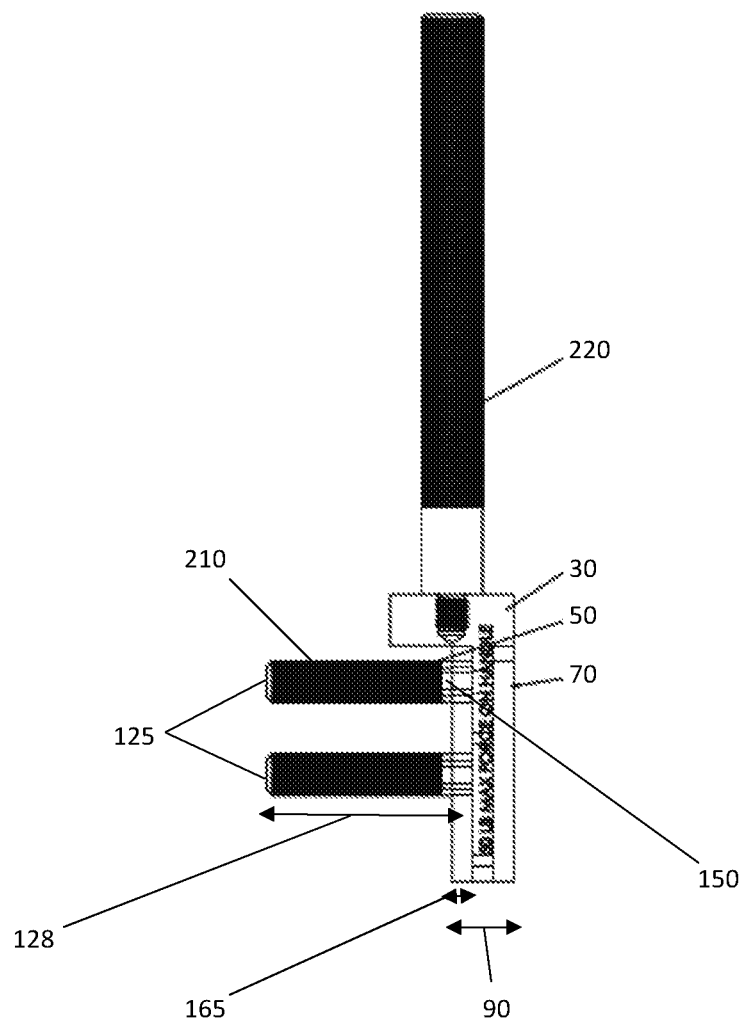
FIG. 3 is a top view of one embodiment of the belt pulling tool of this invention.

In an illustrative embodiment shown in FIGS. 1-3, the belt pulling tool 10 is comprised of a handle 20, a body 30 each having ends 40A and 40B respectively and two prongs 50. The handle 20 and body 30 are attached at one end 40A and 40B forming a longitudinal length 55 and the two prongs 50 being attached to the body 30 orthogonal to the longitudinal length 55. Attachment at one end 40A and 40B may be permanent such as the body being integral, welded, brazed, glued or the like. Alternatively, said ends 40A and 40B may be attached by removable fasteners such as male and female threaded structures. At least one of the prongs 50 is configured to be moved and fixed along a portion of the body 30 parallel or nearly parallel (i.e., within about 15° or 20° from parallel) to the longitudinal length 55.

The belt pulling tool 10 may be made from any suitable material such as a metal, metal-ceramic composite, plastic composite, wood or wood composite or the like or combinations thereof. For example, the handle 20, body 30 and prongs 50 may be the same or different materials and each one of these may be a combination of materials. Likewise, each of these themselves may be made of any combinations of materials. For example, the handle or prongs may be constructed of a metal and on a portion of the surface of each the prongs a composition such as a rubber coating may be adhered to the surface to increase the gripping ease or gripping ability compared to a smooth metal surface. In one embodiment, the metal may be iron or an iron alloy (e.g., steel) or aluminum or an aluminum alloy. Preferably, the tool 10 is entirely constructed of aluminum or an aluminum alloy. An exemplary useful aluminum alloy is aluminum a 6000 series aluminum with 6061-T6 aluminum alloy being particularly useful.

In the illustrative embodiment of the tool 10, the body 30 has a top face 60 and a bottom face 70 and two sides 80 that define a body thickness 90, body width 100 and body length 105, the body length being parallel with longitudinal length 55 and the body thickness 90 and body width 100 being orthogonal to the body length 105. In the top face 60, there is a prong accepting slot 110 running along a portion of the body length 105 which is configured to accept prongs 40, wherein the prongs 40 have prong attachment ends 120 having flats 130 and distal prong ends 125, said ends defining prong length 128. The flats 130 fit between side walls 140 that define the slot width 150 and slot floor 160 that defines the slot depth 165 of the prong accepting slot 110. The slot floor 160 may have one or more holes 180 useful to fix prongs 40 to body 30.

In the illustrative embodiment, there may be a second slot 190 on bottom face 70 mirroring the prong accepting slot 110, which may be used to attach fasteners (not pictured to prongs 40 at prong attachment ends 120 having a fastener receptor 200. Fastener receptors 200 may be, for example, a threaded blind hole or threaded rod. Holes 180 may be any shape useful for fixing prongs 40. Illustratively there may be one hole 180 that is rectangular with two flat opposing sides with the other opposing sides being arcs as shown in FIG. 2. In another embodiment, there is one of the aforementioned holes 180 and hole 180 that is circular for fixing one prong 40 (not shown). Alternatively, one prong 40 may be integral with the body 30 or otherwise permanently affixed to body 30, for example, welded, brazed or glued. In another embodiment, there may be more than two circular holes 180 allowing the movement of prongs 40 along the body length 105 by removing prongs 40 and fixing at differing holes 180 by a fastener. Any suitable fastener may be used, for example, the fastener may be a bolt or machine screw that may have a lock washer.

In an embodiment, prongs 40 may have a surface 210 that have a composition as described previously or surface 210 may have a texture that increases ability of prongs 40 to grip drive belt (not shown). Illustratively, surface 210 may be knurled or roughened such as by sand blasting, bead finishing or the like. Likewise, handle 20 may have surface 220 that has a composition for increasing the gripping ability by hand such as described previously or textured in the manner just described. The prongs 40 may have any useful cross-sectional shape such as circular, oval, polygonal (e.g., octagonal, hexagonal, or square). In a preferred embodiment, prongs 40 have a circular cross-section for a portion of the prong length 128 and a polygon for remaining portion of the prong length 128. In a particular embodiment, prongs 40 have a circular cross-section for a portion of prong length 128 and a polygon having two straight lines connected by arcs.

The belt pulling tool is particularly useful for aligning the belt of belt driven machinery and in particular industrial belt driven machinery. In the method, an apparatus having a shaft that has a sheave having a belt having a thickness, width and length that is driven by a motor having a shaft and a sheave with the belt such that when the motor shaft rotates the shaft of the apparatus rotates by motion of the belt is provided. Examples of such machinery or apparatus include pumps, booster and blowers such as available from Roots Systems Ltd., Gloucestershire, England.

Prior to using the belt pulling tool to cause the belt to move (rotate the sheaves), one or more of the prongs of the belt pulling tool are moved such that prongs form a gap between the prongs. Said gap is greater than the thickness of the belt but less than a separation corresponding to when the belt is inserted between the gap parallel to the thickness of the belt such that handle is perpendicular to the belt length and both prongs engage with the belt upon the tool handle being rotated less than or equal to forty five degrees around an axis extending from the center of the gap parallel to the length of the prongs Desirably, the prongs engage the belt within 30 or even 15 degrees of the aforementioned rotation. Typically, the gap of the prongs is at least 1 mm to 10 mm greater than the thickness of the belt.

Once the prongs are fixed at the gap described above, the belt is inserted into the gap and the tool is rotated by applying a force on the tool handle and once the prongs of the tool engage with the belt, a force sufficient to initiate and cause the belt to rotate the sheaves is applied. Once the belt is moving sufficiently rotating the sheaves, the belt is withdrawn from the belt by rotating the tool in the opposite direction of rotation described above causing the prongs to become disengaged and withdrawing the belt from the gap. The belt alignment may then be set by use of suitable alignment tools such as laser alignment gauges that are affixed to the sheaves prior to rotation. As the belt and sheaves rotate, the alignment may be set by moving the motor or apparatus on its mounts and fixing one or more bolts or set screws to adjust the position of each sheave. The rotation of the belt also seats the belt as the sheaves are aligned. The belt tension may then be set by adjusting the distance between the sheaves of the motor and apparatus, which typically is done by moving the motor on its mounts and fixing a set screw once the proper tension has been achieved as per the apparatus specification using an appropriate belt tensioning measuring device such as a belt tension gauge. The process may be repeated to check and reset the alignment as well as further letting the belt seat on the sheaves prior to operating at full speed.

What is claimed is:

1. A belt pulling tool comprising:
a handle,
a body and two prongs, the handle and body each having two ends with one end of each being attached to the other forming a longitudinal length and the two prongs being attached to the body orthogonal to the length,
the body having a prong accepting slot for receiving the prongs, the slot extending along a portion of the length of the body, the slot having an open end on a bottom face of the body, the bottom face being a distalmost body face from the handle,
wherein at least one prong is configured to be moved and fixed along a portion of the body parallel or nearly parallel to the longitudinal length.

2. A belt pulling tool comprising:
a handle,
a body and two prongs, the handle and body each having two ends with one end of each being attached to the other forming a longitudinal length and the two prongs being attached to the body orthogonal to the length,
wherein at least one prong is configured to be moved and fixed along a portion of the body parallel or nearly parallel to the longitudinal length,
wherein the body has walls defining a top face, bottom face, sides such that the distance between top and bottom face define a body thickness and the distance between the sides define a body width, said body width and thickness being orthogonal to the length and the body has a prong accepting slot running along the length of the top face with a slot depth and slot width that only partially traverses the body thickness and body width,
wherein at least one prong has a prong attachment end and distal end defining a prong length, the prong having a flat surface on a portion of the length starting from the prong attachment end with said prong attachment end being configured to be accepted into the slot of the body, and
wherein the body has a second slot on the bottom face mirroring the prong accepting slot.

3. The belt pulling tool of claim 2, wherein the body has one or more holes for fastening the prongs to the body with a fastener.

4. The belt pulling tool of claim 1, wherein a prong has a surface that has a texture or composition that improves the ability of the prongs to grip a drive belt.

5. The belt pulling tool of claim 4, wherein the surface is knurled.

6. A belt pulling tool comprising:
   a handle,
   a body and two prongs, the handle and body each having two ends with one end of each being attached to the other forming a longitudinal length and the two prongs being attached to the body orthogonal to the length,
   wherein at least one prong is configured to be moved and fixed along a portion of the body parallel or nearly parallel to the longitudinal length,
   wherein the prongs have a cross-sectional shape that is a circle, oval, polygon or combination thereof,
   wherein the cross-sectional shape is a circle for a portion of the length of the prong and a polygon for the remaining portion, and
   wherein the polygon comprises two opposing straight lines connected by arcs.

7. The belt pulling tool of claim 6, wherein the polygon is comprised of two opposing straight lines connected by arcs.

8. The belt pulling tool of claim 1, wherein said tool is comprised of aluminum or alloy thereof.

9. The belt pulling tool of claim 1 wherein the slot has a closed end on a top face of the body, the top face being a proximate-most body face to the handle.

10. The belt pulling tool of claim 9 wherein the body has a width that is greater than the width of the handle.

* * * * *